US009051184B2

(12) United States Patent
Levasseur et al.

(10) Patent No.: US 9,051,184 B2
(45) Date of Patent: *Jun. 9, 2015

(54) SYNTHESIS OF CRYSTALLINE NANOMETRIC LIFEMPO$_4$

(75) Inventors: Stéphane Levasseur, Brussels (BE); Michèle Van Thournout, Isières (BE); Pierre Gibot, Amiens (FR); Christian Masquelier, Boves (FR)

(73) Assignees: Umicore, Brussels (BE); Centre National de la Recherche Scientifique, Paris Cedex (FR)

( * ) Notice: Subject to any disclaimer, the term of this patent is extended or adjusted under 35 U.S.C. 154(b) by 700 days.

This patent is subject to a terminal disclaimer.

(21) Appl. No.: 13/267,135

(22) Filed: Oct. 6, 2011

(65) Prior Publication Data
US 2012/0085975 A1    Apr. 12, 2012

Related U.S. Application Data

(62) Division of application No. 12/519,853, filed as application No. PCT/EP2007/009969 on Nov. 19, 2007, now Pat. No. 8,066,916.

(60) Provisional application No. 60/881,509, filed on Jan. 22, 2007.

(30) Foreign Application Priority Data

Dec. 22, 2006  (EP) .................................. 06292048

(51) Int. Cl.
*H01B 1/08*    (2006.01)
*H01B 1/06*    (2006.01)
(Continued)

(52) U.S. Cl.
CPC  *C01B 25/45* (2013.01); *H01B 1/08* (2013.01); *H01B 1/06* (2013.01); *B82Y 30/00* (2013.01);
(Continued)

(58) Field of Classification Search
CPC ........... H01B 1/06; H01B 1/08; H01M 4/525; H01M 4/5805; C01B 25/12; C01B 25/30; C01B 25/305; C01B 25/375; C01G 51/00; C01G 49/00
USPC .................. 252/518.1, 521.2, 521.5; 423/138, 423/179.5, 306, 315
See application file for complete search history.

(56) References Cited

U.S. PATENT DOCUMENTS 5,910,382 A    6/1999  Goodenough et al.
6,749,967 B2   6/2004  Li et al.
(Continued)

FOREIGN PATENT DOCUMENTS

CA    2443725    10/2002
CN    1571195    1/2005
(Continued)

OTHER PUBLICATIONS

Extract from Wikipedia "Scherrer equation", http://en.wikipedia.org/wiki/scherrer_equation, printed May 6, 2013.
(Continued)

*Primary Examiner* — Mark Kopec
(74) *Attorney, Agent, or Firm* — Brinks Gilson & Lione

(57) ABSTRACT

The invention relates to crystalline nanometric olivine-type LiFe$_{1-x}$M$_x$PO$_4$ powder with M being Co and/or Mn, and 0≤x≤1, with small particle size and narrow particle size distribution. A direct precipitation process is described, comprising the steps of: providing a water-based mixture having at a pH between 6 and 10, containing a dipolar aprotic additive, and Li$^{(I)}$, Fe$^{(II)}$, P$^{(V)}$, and Co$^{(II)}$ and/or Mn$^{(II)}$ as precursor components; heating said water-based mixture to a temperature less than or equal to its boiling point at atmospheric pressure, thereby precipitating crystalline LiFe$_{1-x}$M$_x$PO$_4$ powder. An extremely fine particle size is obtained of about 80 nm for Mn and 275 nm for Co, both with a narrow distribution.

14 Claims, 6 Drawing Sheets

Figure 1:
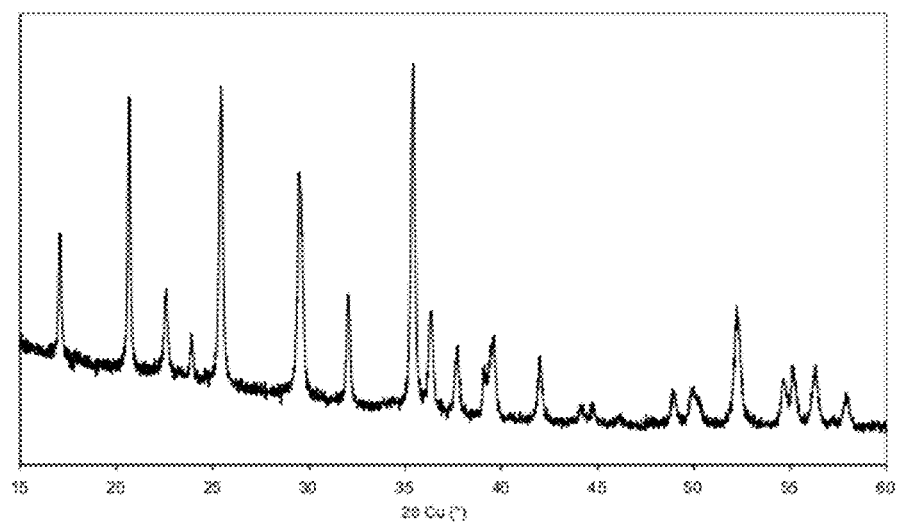

(51) Int. Cl.

| | | |
|---|---|---|
| C01B 25/45 | (2006.01) | |
| B82Y 30/00 | (2011.01) | |
| H01M 4/136 | (2010.01) | |
| H01M 4/58 | (2010.01) | |
| H01M 4/02 | (2006.01) | |
| H01M 10/052 | (2010.01) | |

(52) U.S. Cl.
CPC ............... *H01M 4/02* (2013.01); *H01M 4/136* (2013.01); *H01M 4/5825* (2013.01); *H01M 10/052* (2013.01); *H01M 2004/021* (2013.01); *Y02E 60/122* (2013.01)

(56) References Cited

U.S. PATENT DOCUMENTS

| | | | | |
|---|---|---|---|---|
| 7,338,647 | B2* | 3/2008 | Huang et al. | 423/306 |
| 7,390,472 | B1 | 6/2008 | Singhal et al. | |
| 7,601,318 | B2* | 10/2009 | Armand et al. | 423/306 |
| 7,998,618 | B2 | 8/2011 | Nuspl et al. | |
| 8,236,453 | B2* | 8/2012 | Audemer et al. | 429/231.95 |
| 2002/0192137 | A1 | 12/2002 | Chaloner-Gill et al. | |
| 2004/0175614 | A1 | 9/2004 | Wurm et al. | |
| 2006/0035150 | A1 | 2/2006 | Audemer et al. | |
| 2007/0031732 | A1 | 2/2007 | Chiang et al. | |
| 2008/0241690 | A1* | 10/2008 | Delacourt et al. | 429/221 |
| 2009/0233096 | A1 | 9/2009 | Schall et al. | |
| 2010/0086852 | A1 | 4/2010 | Gibot et al. | |
| 2010/0314589 | A1* | 12/2010 | Armand et al. | 252/519.12 |

FOREIGN PATENT DOCUMENTS

| | | |
|---|---|---|
| EP | 1150367 | 10/2001 |
| EP | 1195838 | 4/2002 |
| EP | 1722428 | 11/2006 |
| EP | 1899268 | 3/2008 |
| EP | 1936721 | 6/2008 |
| JP | 2004079276 | 3/2004 |
| JP | 2004-525059 | 8/2004 |
| JP | 2004259470 | 9/2004 |
| JP | 2005-116393 | 4/2005 |
| JP | 2007-511458 | 5/2007 |
| JP | 2008-088585 | 4/2008 |
| WO | WO 02/083555 | 10/2002 |
| WO | WO02/089233 | 11/2002 |
| WO | WO 02/099913 | 12/2002 |
| WO | WO 04/001881 | 12/2003 |
| WO | WO 2004/056702 | 7/2004 |
| WO | WO 2005/051840 | 6/2005 |
| WO | WO 2006/105848 | 10/2006 |
| WO | WO 2007/000251 | 1/2007 |
| WO | WO2007/100918 | 9/2007 |
| WO | WO 2008/018633 | 2/2008 |
| WO | WO2008/039170 | 4/2008 |
| WO | WO 2008/077447 | 7/2008 |
| WO | WO 2008/077448 | 7/2008 |
| WO | WO 2008/113570 | 9/2008 |

OTHER PUBLICATIONS

Extract from Wikipedia "Atmospheric Pressure" https://en.wikipedia.org/wiki/Atmospheric_pressure, printed May 31, 2013.
Extract from Wikipedia "Powder (substance)" http://en.wikipedia.org/wiki/powder_(substance), printed May 31, 2013.
Lee, J., et al., "Characteristics of Lithium Iron Phosphate (LiFePO4) Particles Synthesized in Subcritical and Supercritical Water", *J. of Supercritical Fluids*, vol. 35 (2005), pp. 83-90.
Horiba Instruments, Inc., "Horiba Scientific—A Guidebook to Particle Size Analysis" (2012).
International Standard ISO 13322-1 "Particle Size Analysis—Image Analysis Methods" (Part 1), 2004.
"Physical Constraints of Inorganic Compounds", CRC Handbook of Chemistry and Physics, CRC Press, 89th Edition, (2008), pp. 4-60 and 4-68.
Extract from Wikipedia "Percentage" https://en.wikipedia.org/wiki/Percentage, printed Jun. 4, 2013.
Amine et al., "Olivine LiCoPO$_4$ as 4.8 V Electrode Material for Lithium Batteries," Electrochemical and Solid-State Letters, vol. 3, No. 4, (2000), pp. 178-179.
Arnold et al., "Fine-Particle Lithium Iron Phosphate LiFePO$_4$ Synthesized by a New Low-Cost Aqueous Precipitation Technique," Journal of Power Sources, vol. 119-121, (2003), pp. 247-251.
Chen et al., "Reducing Carbon in LiFePO$_4$/C Composite Electrodes to Maximize Specific Energy, Volumetric Energy, and Tap Density," Journal of the Electrochemical Society, vol. 149, No. 9, (2002), pp. A1184-A1189.
Delacourt et al., "Low Temperature Preparation of Optimized Phosphates for Li-Battery Applications," Solid State Ionics, vol. 173, (2004), pp. 113-118.
Delacourt et al., "One-Step Low-Temperature Route for the Preparation of Electrochemically Active LiMnPO$_4$ Powders," Chem. Mater., vol. 16, (2004), pp. 93-99.
Delacourt et al., "The Existence of a Temperature-Driven Solid Solution in LixFePO4 for $0 \leq x \leq 1$," Nature Publishing Group, (2005), pp. 1-7.
Delacourt et al., "Toward Understanding of Electrical Limitations (Electronic, Ionic) in LiMPO$_4$ (M=Fe, Mn) Electrode Materials," Journal of the Electrochemical Society, vol. 152, No. 5, (2005), pp. A913-A921.
Dodd et al., "Phase Diagram of LixFePO4," Electrochemical and Solid-State Letters, vol. 9, No. 3, (2006), pp. A151-A155.
European Search Report, issued in EP 06292048.3, dated Apr. 25, 2007.
Extended European Search Report, issued in EP07290328.9-2119, dated Sep. 20, 2007.
Franger et al., "Comparison Between Different LiFePO$_4$ Synthesis Routes and Their Influence on its Physico-Chemical Properties," Journal of Power Sources, vol. 119-121, (2003), pp. 252-257.
International Preliminary Report on Patentability, issued in PCT/EP2007/009969, dated Jul. 2, 2009.
International Preliminary Report on Patentability, issued in PCT/EP2007/009968, dated Jul. 2, 2009.
International Preliminary Report on Patentability, issued in PCT/EP2008/002195, dated Jun. 23, 2009.
International Search Report, issued in PCT/EP2007/009968, dated Apr. 14, 2008.
International Search Report, issued in PCT/EP2007/009969, dated Mar. 26, 2008.
International Search Report, Issued in PCT/EP2008/002195, dated Aug. 14, 2008.
Kwon et al., "Enhanced Electrochemical Performance of Mesoparticulate LiMnPO$_4$ for Lithium Ion Batteries," Electrochemical and Solid-State Letters, vol. 9, No. 6, (2006), pp. A277-A280.
Li et al., "LiMnPO$_4$ as the Cathode for Lithium Batteries," Electrochemical and Solid-State Letters, vol. 5, No. 6, (2002), pp. A135-A137.
Lloris et al., "Improvement of the Electrochemical Performance of LiCoPO$_4$ 5 V Material Using a Novel Synthesis Procedure," Electrochemical and Solid-State Letters, vol. 5, No. 10, (2002), A234-A237.
Ma et al., "Electrochemical Performance of Nanocrystalline LiMPO$_4$ Thin-Films Prepared by Electrostatic Spray Deposition," Journal of Power Sources, vol. 148, (2005), pp. 66-71.
Mi et al., "Synthesis and Performance of LiMn$_{0.6}$Fe$_{0.4}$PO$_4$/Nano-Carbon Webs Composite Cathode," Materials Science and Engineering, vol. B, No. 129, (2006), pp. 8-13.
Nuspl et al., "Ultrafine LiFePO$_4$ Synthesized by an Optimized Hydrothermal Process," Abs. 293, IMLB 12 Meeting, (2004).
Office Action, dated Nov. 3, 2010, issued in co-pending, commonly assigned U.S. Appl. No. 12/825,682.
Office Action, dated Apr. 26, 2011, issued in co-pending, commonly assigned U.S. Appl. No. 12/825,682.
Okada et al., "Cathode Properties of Phospho-Olivine LiMPO$_4$ for Lithium Secondary Batteries," Journal of Power Sources, vol. 97-98, (2001), pp. 430-432.
Padhi et al., "Phospho-Olivines as Positive-Electrode Materials for Rechargeable Lithium Batteries," J. Electrochem. Soc., vol. 144, No. 4, (Apr. 1997), pp. 1188-1194.

(56) References Cited

OTHER PUBLICATIONS

Striebel et al., "Comparison of LiFePO$_4$ from Different Sources," Journal of the Electrochemical Society, vol. 152, No. 4, (2005), pp. A664-A670.

Wang et al., "Extraction of Layerwise Conductivities in Carbon-Enhanced, Multilayered LiFePO$_4$ Cathodes," Journal of the Electrochemical Society, vol. 152, No. 5, (2005), pp. A1001-A1010.

Yamada et al., "Phase Change in Li$_x$FePO$_4$," Electrochemical and Solid-State Letters, vol. 8, No. 8, (2005), pp. A409-A413.

Yonemura et al., "Comparative Kinetic Study of Olivine Li$_x$MPO$_4$ (M=Fe, Mn)," Journal of the Electrochemical Society, vol. 151, No. 9, (2004), pp. A1352-A1356.

English translation of Japanese Office Action Apr. 1, 2013 for Application No. 2009-541796.

* cited by examiner

SYNTHESIS OF CRYSTALLINE NANOMETRIC LIFEMPO$_4$

This application is a divisional application of U.S. application Ser. No. 12/519,853, filed Sep. 30, 2009, issued as U.S. Pat. No. 8,066,916, which is a national stage application of International Application No. PCT/EP2007/009969, filed Nov. 19, 2007, which claims priority to European Patent Application No. 06292048.3, filed Dec. 22, 2006, and U.S. Provisional Patent Application No. 60/881,509, filed Jan. 22, 2007, the entire contents of which are hereby incorporated by reference.

The invention relates to a crystalline nanometric LiFe$_{1-x}$M$_x$PO$_4$ (LFMP) powder with small particle size and narrow particle size distribution for use as positive electrode material in Li batteries. It also describes a preferred manufacturing method by precipitation at low temperature and atmospheric pressure of the crystalline nanometric powder.

Since the original work of Padhi et al. (JES, 144 (1997), 1188), phospho-olivines LiMPO$_4$ (with M=Fe, Ni, Co, Mn, . . . ) have appeared to be potential candidates to be used as cathode materials for Li batteries. Among all these isostructural compositions, LiFePO$_4$ was the most investigated and its commercialization is now a reality thanks to very high performances in term of reversible capacity, rate properties and cycle life (International Publication Number WO2004/001881 A2).

LiCoPO$_4$ (Amine et al., ESSL, 3, (2000), 178) and LiMnPO$_4$ (Okada et al., J. Power Sources, 97-98 (2001) 430), due to their higher redox potential values of 4.8 V and 4.1 V vs. Li respectively, are of particular interest because of the higher energy density they offer compared to LiFePO$_4$ (3.5V vs. Li, Chen et al., JES, 149 (2002) A1184).

However, it is now well known that these phospho-olivines materials suffer from poor electronic and ionic conductivity (Delacourt et al., JES, 152 (2005) A913) so that the need for optimizing the microstructure of these compounds is essential. Striebel et al. (JES, 152, (2005), A664) insisted on the fact that, even if the matrix conductivity has been improved by conductive coating, the battery developer would welcome so-far inexistent compounds having a primary particle size in the 50 to 100 nm range and, overall, attempts should be made to minimize the particle size distribution, in order to yield better power efficiency.

Most promising results on mixed metal phosphates such as LiFe$_{1-x}$Mn$_x$PO$_4$ materials were obtained on C/LiFe$_{0.4}$Mn$_{0.6}$PO$_4$ composites, in which C acts as a sintering inhibitor. This approach leads to mixed C/LiFeMnPO$_4$ composites with particles in the 100 to 200 nm range (Mi et al., Mater. Sci. Eng., 129 (2006) 8). Similar results were obtained by Lloris et al. (ESSL, 5 (2002) A234), on pure LiCoPO$_4$ with small particles in the 200 to 300 nm range. No data were published on LiFe$_{1-x}$CO$_x$PO$_4$ materials so far.

In addition to the small particle size, emphasis must be put on narrowing the particle size distribution in order to ensure a homogeneous current distribution in the electrode and thus achieve better battery performances, in particular high power efficiency and long cycle life. The present invention therefore aims at providing a crystalline LFMP powder with small particle size and narrow particle size distribution.

To this end, a process is disclosed yielding metal phosphate powders offering essential improvements over the materials cited above.

The invented process for the synthesis of crystalline LiFe$_{1-x}$M$_x$PO$_4$ powder where M is one or both of Co and Mn, and $0 \leq x \leq 1$, preferably $0.4 \leq x \leq 0.95$, comprises the steps of:

providing a water-based mixture having a pH between 6 and 10, containing a dipolar aprotic additive, and Li$^{(I)}$, Fe$^{(II)}$, P$^{(V)}$, and one or both of Co$^{(II)}$ and Mn$^{(II)}$ as precursor components;

heating said water-based mixture to a temperature less than or equal to its boiling point at atmospheric pressure, thereby precipitating crystalline LiFe$_{1-x}$M$_x$PO$_4$ powder. The obtained powder can be subjected to a post-treatment by heating it in non-oxidizing conditions.

A pH of between 6 and 8 is however preferred to avoid any precipitation of Li$_3$PO$_4$. The additive is preferably a dipolar aprotic compound without chelating or complexation propensity. The heating temperature of the water-based mixture of at least 60° C. is preferred.

The production of the crystalline LiFe$_{1-x}$M$_x$PO$_4$ powder or the thermal post-treatment can advantageously be performed in the presence of at least one further component, in particular a carbon containing or electron conducting substance, or the precursor of an electron conducting substance.

It is useful to introduce at least part of the Li$^{(I)}$ is as LiOH. Similarly, at least part of the P$^{(V)}$ can be introduced as H$_3$PO$_4$. The pH of the water-based mixture can be obtained by adjusting the ratio of LiOH to H$_3$PO$_4$.

It is advisable to use a water-based mixture with an atmospheric boiling point of between 100 and 150° C., and preferably between 100 and 120° C. Dimethylsulfoxide (DMSO) is preferably used as the dipolar aprotic additive. The water-based mixture advantageously contains between 5 and 50% mol, and preferably between 10 and 30% mol, of DMSO. A lower DMSO concentrations result in a coarser particle size distribution; higher concentrations limit the availability of water, forcing to increase the volume of the apparatus.

The step of post treatment of the LiFe$_{1-x}$M$_x$PO$_4$ is advantageously performed at a temperature of up to 675° C., and preferably of at least 300° C. The lower limit is chosen in order to enhance the crystallinity of the precipitated LiFe$_{1-x}$M$_x$PO$_4$; the upper limit is chosen to avoid the decomposition of the LiFe$_{1-x}$M$_x$PO$_4$ into manganese phosphides.

The electron conducting substance can be carbon, in particular conductive carbon or carbon fibers. Alternatively, a precursor of an electron conducting substance can be used, in particular a polymer or sugar-type macromolecule.

The invention also pertains to a crystalline LiFe$_{1-x}$Mn$_x$PO$_4$ powder with $0 \leq x \leq 1$, preferably $0.4 \leq x \leq 0.95$, for use as electrode material in a battery, having a particle size distribution with an average particle size d50 of less than 100 nm, and preferably of more than 30 nm. The maximum particle size is preferably less than or equal to 500 nm. The particle size distribution is preferably mono-modal and the ratio (d90−d10)/d50 is advantageously less than 1.5, preferably less than 1.3.

Another embodiment of this invention concerns a composite powder containing the above-defined crystalline LiMnPO$_4$ powder, and up to 10% wt of conductive additive. A further embodiment concerns the electrode mix that can be prepared using this composite powder. Conductive carbons, carbon fibers, amorphous carbons resulting from decomposition of organic carbon containing substances, electron conducting polymers, metallic powders, and metallic fibers are particularly well suited as conductive additives.

Another embodiment of this invention concerns the use of the composite powder for the manufacture of a lithium insertion-type electrode, by mixing said powder with a conductive carbon-bearing additive.

The invention also pertains to a crystalline LiFe$_{1-x}$CO$_x$PO$_4$ powder with $0 \leq x \leq 1$, preferably $0.4 \leq x \leq 0.95$, for use as electrode material in a battery, having a particle size distribution with an average particle size d50 of less than 300 nm, and preferably of more than 30 nm. The maximum particle size is preferably less than or equal to 900 nm. The particle size distribution is preferably mono-modal and the ratio (d90–d10)/d50 is advantageously less than 1.5, preferably less than 1.1.

Another embodiment of this invention concerns a composite powder containing the above-defined crystalline $LiFe_{1-x}Co_xPO_4$ powder, and up to 10% wt of conductive additive. A further embodiment concerns the electrode mix that can be prepared using this composite powder. Conductive carbons, carbon fibers, amorphous carbons resulting from decomposition of organic carbon containing substances, electron conducting polymers, metallic powders, and metallic fibers are particularly well suited as conductive additives.

Another embodiment of this invention concerns the use of the composite powder for the manufacture of a lithium insertion-type electrode, by mixing said powder with a conductive carbon-bearing additive.

Compared to prior art, this product lists all the advantages needed for being considered as potential cathode material in lithium battery:
  the direct precipitation of crystalline LFMP at low temperature prevents any grain growth linked to sintering processes. Nanometric particle sizes are obtained. This reduces kinetic limitations due to Li ions transport within the particle, thereby enhancing the fast charge/discharge behavior of the batteries.
  the narrow particle size distribution ensures a homogeneous current distribution within the battery. This is especially important at high charge/discharge rates, where finer particles would get more depleted than coarser ones, a phenomenon leading to the eventual deterioration of the particles and to the fading of the battery capacity upon use. Furthermore, it facilitates manufacturing of the electrode.

The atmospheric boiling point of the water-based mixture is advisably between 100 and 150° C., preferably between 100 and 120° C. Use is made of a water-miscible additive as a co-solvent that will increase the precipitate nucleation kinetics thus reducing the size of the $LiMnPO_4$ nanometric particles. In addition to being miscible with water, useful co-solvents should be aprotic, i.e., show only a minor or complete absence of dissociation accompanied by release of hydrogen ions. Co-solvents showing complexation or chelating properties such as ethylene glycol do not appear suitable as they will reduce the kinetics of precipitation of $LiMnPO_4$ and thus lead to larger particle sizes. Suitable dipolar aprotic solvents are dioxane, tetrahydrofuran, N—($C_1$-$C_{18}$-alkyl) pyrrolidone, ethylene glycol dimethyl ether, $C_1$-$C_4$-alkylesters of aliphatic $C_1$-$C_6$-carboxylic acids, $C_1$-$C_6$-dialkyl ethers, N,N-di-($C_1$-$C_4$-alkyl)amides of aliphatic $C_1$-$C_4$-carboxylic acids, sulfolane, 1,3-di-($C_1$-$C_8$-alkyl)-2-imidazolidinone, N—($C_1$-$C_8$-alkyl)caprolactam, N,N,N',N'-tetra-($C_1$-$C_8$-alkyl)urea, 1,3-di-($C_1$-$C_8$-alkyl)-3,4,5,6-tetrahydro-2(1H)-pyrimidone, N,N,N',N-tetra-($C_1$-$C_8$-alkyl)sulfamide, 4-formylmorpholine, 1-formylpiperidine or 1-formylpyrrolidine, N—($C_1C_{18}$-alkyl)pyrrolidone, N-methylpyrrolidone (NMP), N-octylpyrrolidone, N-dodecylpyrrolidone, N,N-dimethylformamide, N,N-dimethylacetamide or hexamethylphosphoramide. Other alternatives such as tetraalkyl ureas are also possible. Mixtures of the above-mentioned dipolar aprotic solvents may also be used. In a preferred embodiment, dimethylsulfoxide (DMSO) is used as solvent.

The Figures illustrating the invention are summarized as follows.

Figure 2:
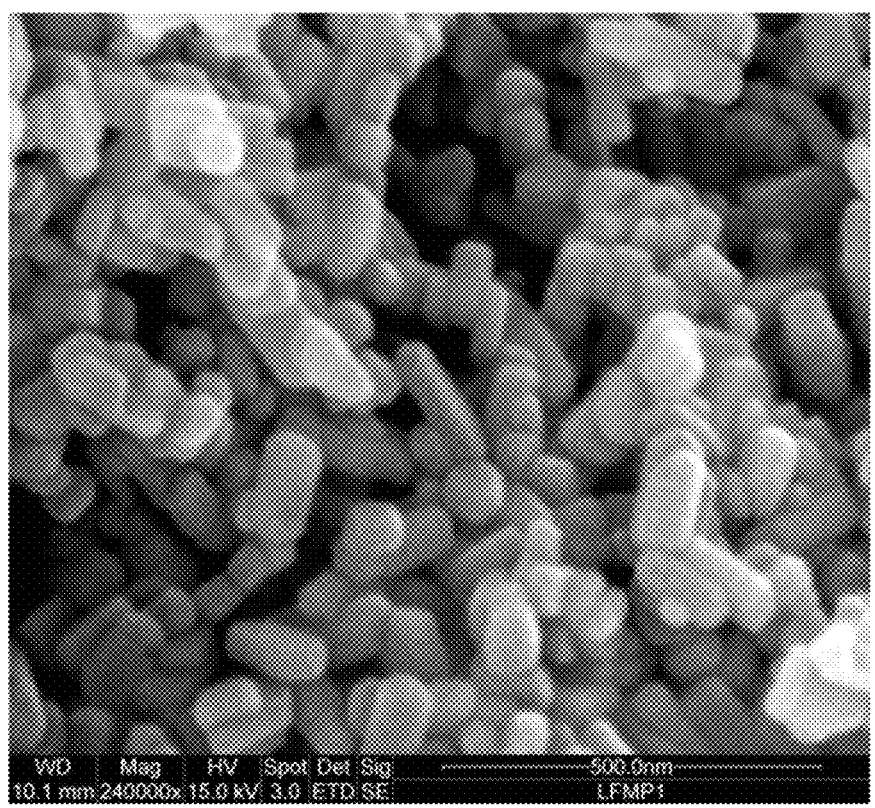
Figure 3:
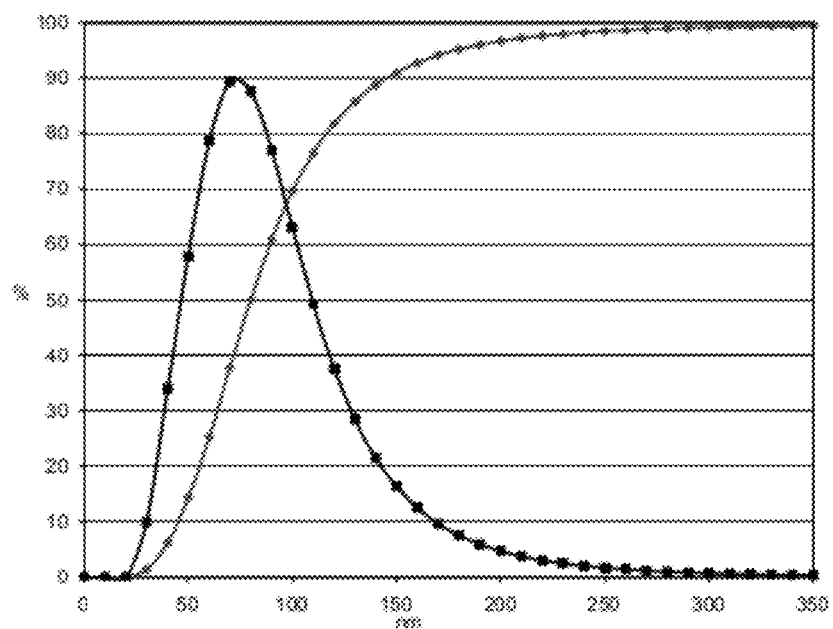
Figure 4:
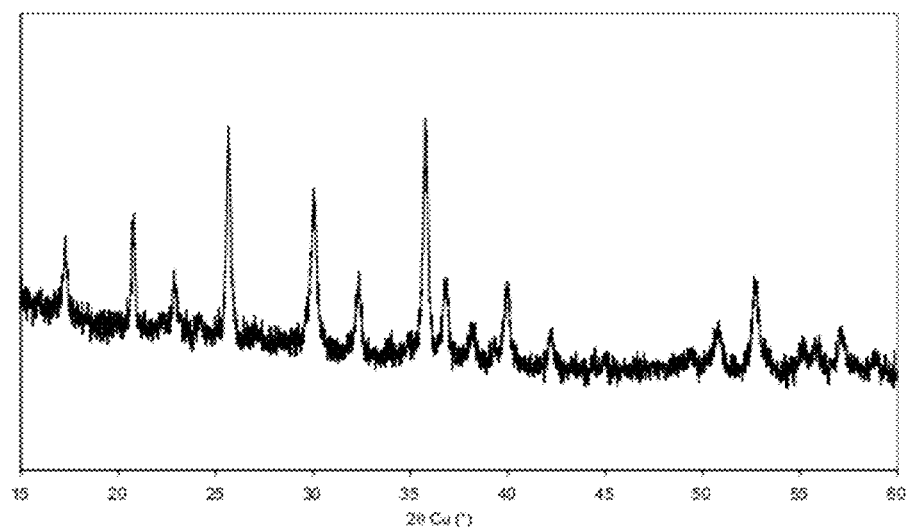
Figure 5:
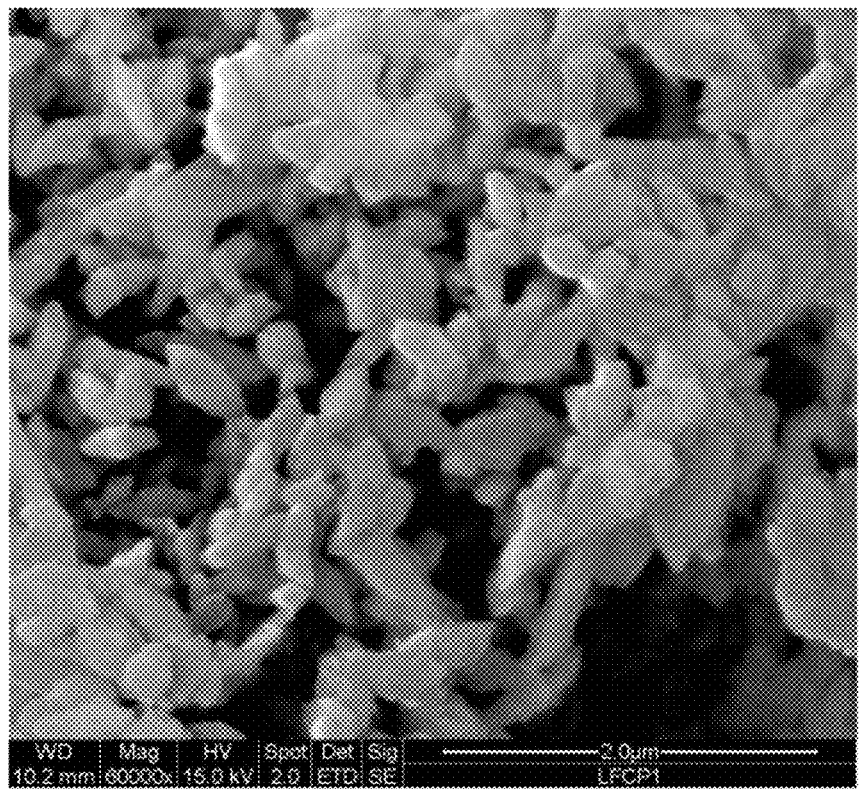
Figure 6:
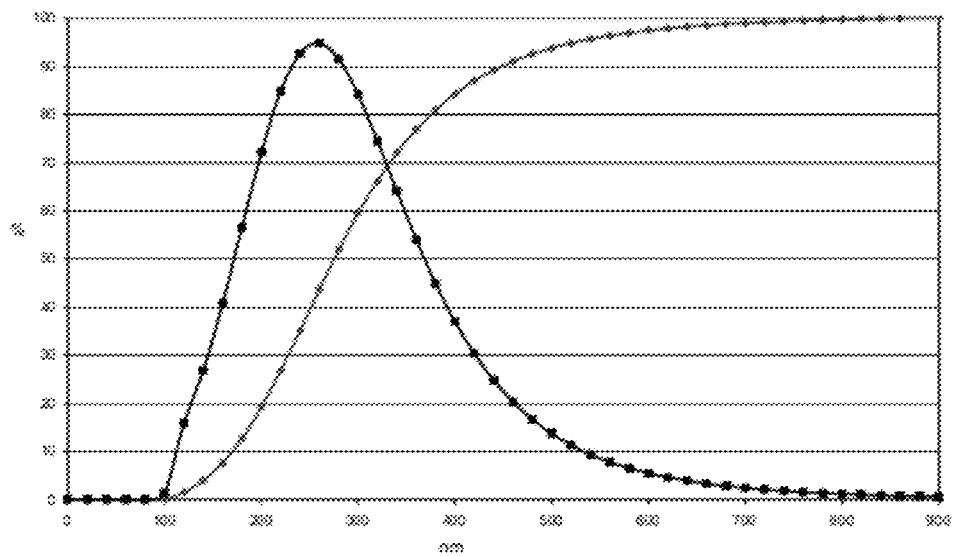

FIG. 1: XRD of the $LiFe_{0.5}Mn_{0.5}PO_4$ precipitate after 18 h reaction time.
FIG. 2: SEM picture of the $LiFe_{0.5}Mn_{0.5}PO_4$.
FIG. 3: Volumetric particle size distribution and cumulative distribution (% vs. nm) of the $LiFe_{0.5}Mn_{0.5}PO_4$.
FIG. 4: XRD of the $LiFe_{0.5}Co_{0.5}PO_4$ precipitate after 18 h reaction time.
FIG. 5: SEM picture of the $LiFe_{0.5}Co_{0.5}PO_4$.
FIG. 6: Volumetric particle size distribution and cumulative distribution (% vs. nm) of the $LiFe_{0.5}Co_{0.5}PO_4$.

The invention is further illustrated in the following examples.

EXAMPLE 1

Synthesis of $LiFe_{0.5}Mn_{0.5}PO_4$

In a first step, DMSO is added to an equimolar solution of 0.05 M $Mn^{(II)}$ in $MnNO_3.4H_2O$, 0.05 M $Fe^{(II)}$ in $FeSO_4.7H_2O$ and 0.1 M $P^{(V)}$ in $H_3PO_4$, dissolved in $H_2O$ while stirring. The amount of DMSO is adjusted in order to reach a global composition of 50% vol water and 50% vol DMSO corresponding to respectively about 80% mol and 20% mol.

In a second step, an aqueous solution of 0.3 M $LiOH.H_2O$ is added to the solution at 25° C.; the pH hereby increases to a value between 6.5 and 7.5. The final Li:Fe:Mn:P ratio is close to 3:0.5:0.5:1.

In a third step, the temperature of the solution is increased up to the solvent boiling point, which is 108 to 110° C. After 18 h, the obtained precipitate is filtered and washed thoroughly with water. The pure crystalline $LiFe_{0.5}Mn_{0.5}PO_4$ obtained is shown in FIG. 1.

The refined cell parameters are a=10.390 Å, b=6.043 Å; c=4.721 Å, with a cell volume of 296.4 Å$^3$. This is in good agreement with Vegard's law specifying that, in case of solid solution, the cell volume of mixed product should be in-between that of end products (291 Å$^3$ for pure $LiFePO_4$, 302 Å$^3$ for pure $LiMnPO_4$).

The picture on FIG. 2 shows monodisperse small crystalline particles in the 50-100 nm range. The volumetric particle size distribution of the product was measured using image analysis. As shown in FIG. 3, the d50 value is about 80 nm, while the relative span, defined as (d90–d10)/d50, is about 1.2 (d10=45 nm, d90=145 nm).

EXAMPLE 2

Synthesis of $LiFe_{0.5}Co_{0.5}PO_4$

In a first step, DMSO is added to an equimolar solution of 0.05 M $Mn^{(II)}$ in $MnSO_4.H_2O$, 0.05 M $Co^{(II)}$ in $CoNO_3.6H_2O$ and 0.1 M P(V) in $H_3PO_4$, dissolved in $H_2O$ while stirring. The amount of DMSO is adjusted in order to reach a global composition of 50% vol. water and 50% vol. DMSO.

In a second step, an aqueous solution of 0.3 M $LiOH.H_2O$ is added to the solution at 25° C.; the pH hereby increases to a value between 6.5 and 7.5. Thus, the final Li:Fe:Co:P ratio is close to 3:0.5:0.5:1.

In a third step, the temperature of the solution is increased up to the solvent boiling point, which is 108 to 110° C. After 18 h, the obtained precipitate is filtered and washed thoroughly with water. The pure crystalline $LiFe_{0.5}Co_{0.5}PO_4$ obtained is shown in FIG. 4.

The refined cell parameters are a=10.292 Å, b=5.947 Å; c=4.712 Å with a cell volume of 288.4 Å$^3$. This is again in good agreement with Vegard's law specifying that, in case of solid solution, the cell volume of mixed product should be in-between that of end products (291 Å$^3$ for pure LiFePO$_4$, 284 Å$^3$ for pure LiCoPO$_4$).

The picture on FIG. 5 shows monodisperse small crystalline particles in the 200-300 nm range. The volumetric particle size distribution of the product was measured by using image analysis. As shown in FIG. 6, the d50 values is about 275 nm, while the relative span, defined as (d90−d10)/d50, is about 1.0 (d10=170 nm, d90=450 nm).

The invention claimed is:

1. A process for preparing crystalline LiFe$_{1-x}$M$_x$PO$_4$ powder where M is one or both of Co and Mn, and 0<x<1, comprising the steps of:
    providing a water-based mixture having a pH between 6 and 10, and containing a dipolar aprotic additive and Li$^{(I)}$, Fe$^{(II)}$, P$^{(V)}$ and one or both of Co$^{(II)}$ and Mn$^{(II)}$ as precursor components; and
    heating said water-based mixture to a temperature less than or equal to its boiling point at atmospheric pressure, thereby precipitating crystalline LiFe$_{1-x}$M$_x$PO$_4$ powder.

2. The process of claim 1, further comprising a step of post-treatment of the LiFe$_{1-x}$M$_x$PO$_4$ powder comprising heating it in non-oxidizing conditions.

3. The process of claim 2, wherein the step of post-treatment of the LiFe$_{1-x}$M$_x$PO$_4$ is performed at a temperature of up to 675° C.

4. The process of claim 2, wherein the post treatment by heating in non-oxidizing atmosphere takes place in the presence of at least one further component, wherein said component is a carbon containing or electron conducting substance or a precursor of an electron conducting substance.

5. The process of claim 4, wherein the electron conducting substance is conductive carbon or carbon fibers.

6. The process of claim 4, wherein the precursor of an electron conducting substance is a polymer or sugar-type macromolecule.

7. The process of claim 1, wherein the precipitation of the crystalline LiFe$_{1-x}$M$_x$PO$_4$ powder takes place in the presence of at least one further component, Wherein said component is a carbon containing or election conducting substance or a precursor of an electron conducting substance.

8. The process of claim 7, wherein the electron conducting substance is conductive carbon or carbon fibers.

9. The process of claim 7, wherein the precursor of an electron conducting substance is a polymer or sugar-type macromolecule.

10. The process of claim 1, wherein at least part of the Li$^{(I)}$ is introduced as LiOH.

11. The process of claim 10, wherein at least part of the P$^{(V)}$ is introduced as H$_3$PO$_4$.

12. The process of claim 11, wherein the pH of the water-based mixture is reached by adjusting the ratio of LiOH to H$_3$PO$_4$.

13. The process of claim 1, wherein the atmospheric boiling point of the water-based mixture is between 100 and 150° C.

14. The process of claim 1, wherein the dipolar aprotic additive is dimethylsulfoxide.

* * * * *